Patented Dec. 28, 1948

2,457,300

UNITED STATES PATENT OFFICE 2,457,300

LOWER POLYMER OF GLYCIDYL SORBATE AND METHOD OF MAKING IT

Albert Bernard Boese, Jr., Pittsburgh, Pa., assignor to Carbide and Carbon Chemicals Corporation, a corporation of New York No Drawing. Application September 24, 1946, Serial No. 699,076

6 Claims. (Cl. 260—348)

This invention relates to lower polymers of glycidyl sorbate and methods of making them.

Glycidyl esters have been suggested for use as heat stabilizers for chlorine-containing resins, and their usefulness seems to be dependent upon the property of reacting with and thus removing the free hydrogen chloride formed on thermal decomposition of the resin. In order that the stabilizer may remain in the resin film during baking, it should have a low vapor pressure. The glycidyl esters of the lower carboxylic acids do not have a sufficiently low vapor pressure for this purpose, and the esters of the carboxylic acids of high molecular weight have an undesirably low ratio of active glycidyl group to the total molecular weight of the ester molecule.

My invention is based on the discovery that glycidyl sorbate may be dimerized to a relatively high boiling product in which the proportion of glycidyl groups to the total molecular weight remains unchanged. The high boiling product which is obtained appears to be comprised chiefly of the diglycidyl esters of $\Delta^3$-5-methyl-6-propenyl tetrahydrophthalic acid and $\Delta^4$-2-propenyl-6-methyl tetrahydroisophthalic acid resulting from the diene condensation of two molecules of glycidyl sorbate. The reaction which takes place may be illustrated by the following equations:

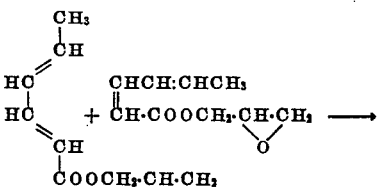

glycidyl sorbate

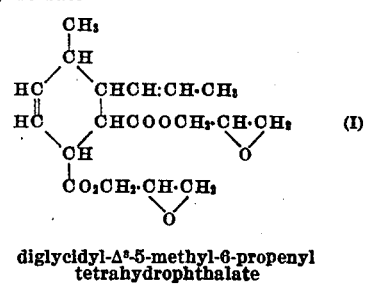

diglycidyl-$\Delta^3$-5-methyl-6-propenyl tetrahydrophthalate

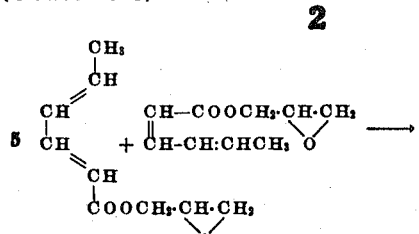

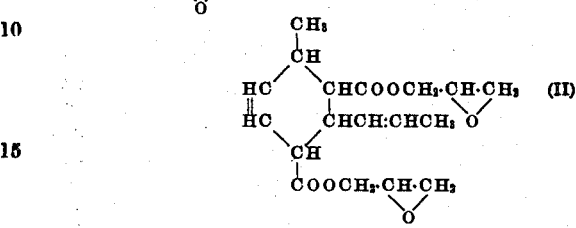

diglycidyl-$\Delta^4$-2-propenyl-6-methyl tetrahydro isophthalate

In addition to the above-named compounds, small quantities of trimers, tetramers or other isomers may also be present. These lower polymers of glycidyl sorbate including the dimer, trimer, tetramer and the like may be referred to for convenience as multimers.

The dimerization of the glycidyl sorbate may be carried out by heating the ester at an elevated temperature for a period of a few hours. Very satisfactory results are obtained by heating the ester at a temperature of about 180 to 200° C. over a period of three to five hours, which is preferred, but higher and lower temperatures with a correspondingly shorter or longer heating period may be used if desired.

Preferably, also, the dimerization should be carried out in an inert atmosphere as, for instance, nitrogen or any of the inert gases such as neon, argon and the like.

At the end of the heating period the product can be used directly as a heat stabilizer, or if desired it may be distilled by some suitable or convenient method, preferably at reduced pressure, after stripping off the unchanged glycidyl sorbate.

The invention may be further explained and illustrated by the following examples:

Example 1

Glycidyl sorbate, 150 parts, by weight, was heated at a temperature of about 180 to 200° C.

for a period of about four hours in an atmosphere of nitrogen. At the end of that time the resulting mixture was fractionally distilled under diminished pressure. There was obtained 92 parts of dimer product which was a somewhat viscous, pale yellow liquid having a boiling temperature of about 200° to 210° C. at a pressure of one millimeter of mercury, absolute, a refractive index (25/D) of 1.4869 and a specific gravity (25/25) of 1.1573. There was also recovered 26 parts of unchanged glycidyl sorbate and 31 parts of residue containing the lower polymers including trimers and tetramers, in addition to some dimers. The yield was 61.3 per cent and the efficiency 74.2 per cent.

*Example 2*

Glycidyl sorbate, 152 parts, by weight, was heated in an atmosphere of nitrogen over a period of about four to five hours at a temperature of about 180° to 200° C. At the end of that time the resulting product was put under a vacuum of one millimeter of mercury pressure, absolute, to remove unchanged glycidyl sorbate. Fifteen parts, by weight, were recovered. There remained 136 parts, by weight, of a straw-colored viscous liquid which was chiefly dimeric glycidyl sorbate. The yield was 89.4 per cent and the efficiency 99.3 per cent.

The undistilled dimeric glycidyl sorbate, as prepared, was equal to the distilled product of Example 1 as a heat stabilizer for halogen-containing resin.

The glycidyl sorbate for making the dimer may itself be produced by heating dry potassium sorbate with epichlorhydrin. An excess of epichlorhydrin may be used as a solvent or diluent. The excess may be varied over rather wide limits. An excess of about three to five mols has been found very satisfactory, and is preferred. Upon the completion of the reaction, the potassium chloride which is formed may be removed by any convenient method, for instance as by filtration or by washing. The excess epichlorhydrin may then be separated by distillation and the glycidyl sorbate distilled under reduced pressure.

The potassium sorbate may be conveniently prepared by neutralizing sorbic acid with aqueous potassium hydroxide and evaporating the resulting solution to dryness. Air-drying at room temperature yields a sufficiently dry salt for use in the reaction.

The reaction between epichlorhydrin and potassium sorbate may be carried out by heating the reactants at about the refluxing temperature of the epichlorhydrin, which boils at 117° C. At this temperature a heating period from about 1 to 24 hours will be sufficient. In the absence of a catalyst, a period of about 16 to 24 hours may be required. A preferred procedure is to conduct the reaction in the presence of a small amount of tertiary amine catalyst, for instance triethylamine, tributylamine, nitrogen-methyl morpholine, ethyl morpholine, pyridine or the like. An amount of catalyst which is about 0.5 per cent, by weight, of the salt and epichlorhydrin in the reaction mixture is adequate for most purposes and under such conditions the reaction takes place in about two hours or less. Higher or lower reaction temperatures may be used by resorting to well-known expedients, as for instance the use of higher or lower pressures or higher or lower boiling solvents or diluents. It is advantageous to carry out the reaction in an inert atmosphere as by the use of nitrogen, carbon dioxide, the inert gases or the like.

The preparation of the glycidyl sorbate may be further illustrated and explained by the following examples:

*Example 3*

A suspension of 75 parts of potassium sorbate, $KOCOCH:CHCH:CHCH_3$, in 278 parts of epichlorhydrin, by weight, was refluxed with stirring for 16 hours. A slow stream of nitrogen was passed through the reaction vessel to maintain an inert atmosphere. At the end of this time the potassium chloride which had formed was removed by filtration. The excess epichlorhydrin was then recovered by distillation at a reduced pressure of about 50 to 100 millimeters of mercury, absolute, and the reaction product remaining then fractionally distilled at a pressure of about 2 to 3 millimeters of mercury. There was obtained 54 parts of glycidyl sorbate boiling at 103° C. at a pressure of 4 millimeters of mercury, absolute, and freezing at a temperature of 17.5° C. It had a specific gravity (25/25) of 1.0578 and a refractive index (25/D) of 1.5152.

*Example 4*

A suspension of 75 parts of potassium sorbate in 185 parts of epichlorhydrin, by weight, to which had been added 0.36 part of triethylamine as catalyst, was refluxed with stirring in an atmosphere of nitrogen. At the end of two hours, the potassium chloride which had formed was removed by filtering, and the filtered mixture then fractionally distilled at reduced pressure. After recovering the unchanged epichlorhydrin, there was obtained 60 parts of glycidyl sorbate having the same properties as the glycidyl sorbate of Example 3. The yield was 71.4 per cent.

Glycidyl sorbate and its preparation are described and claimed in my copending application filed on or about September 24, 1946, Serial No. 699,075.

The invention is susceptible of modification within the scope of the appended claims.

I claim:

1. As a new composition of matter a mixture of lower polymers of glycidyl sorbate.
2. Dimeric glycidyl sorbate.
3. Diglycidyl-$\Delta^3$-5-methyl-6-propenyltetrahydrophthalate.
4. Diglycidyl-$\Delta^4$-2-propenyl-6-methyltetrahydroisophthalate.
5. A process for making a dimer of glycidyl sorbate which comprises heating glycidyl sorbate to a temperature at which diene condensation of the glycidyl sorbate takes place.
6. A process which comprises heating glycidyl sorbate at a temperature of about 180° to 200° C. for a period of about 3 to 5 hours, to form a lower polymer thereof.

ALBERT BERNARD BOESE, Jr.

REFERENCES CITED

The following references are of record in the file of this patent:

Farmer et al., Chemical Society Journal, July-Dec. 1940, pages 1339–42.

Heilbron, Dictionary of Organic Compounds, vol. 3, pages 700–701.